United States Patent [19]
Stephens

[11] Patent Number: 6,137,409
[45] Date of Patent: Oct. 24, 2000

[54] COMPUTER ANTI-THEFT SYSTEM

[76] Inventor: Bruce Randall Stephens, 19314 NE. 172nd St., Woodinville, Wash. 98072

[21] Appl. No.: 09/141,706

[22] Filed: Aug. 28, 1998

[51] Int. Cl.[7] .................................................... G08B 13/14
[52] U.S. Cl. .................. 340/568.1; 340/571; 340/572.9; 70/277; 361/172; 439/306
[58] Field of Search ............................... 340/568.1, 571, 340/572.9, 825.31; 70/277, 278.1, 278.7; 439/304, 306; 361/172

[56] References Cited

U.S. PATENT DOCUMENTS

| | | | |
|---|---|---|---|
| 4,155,079 | 5/1979 | Chiu et al. | 340/571 |
| 4,272,763 | 6/1981 | Chang et al. | 340/571 |
| 5,169,332 | 12/1992 | Cooke et al. | 439/304 |
| 5,400,622 | 3/1995 | Harmon | 70/14 |
| 5,660,065 | 8/1997 | Edlund | 70/58 |
| 5,675,321 | 10/1997 | McBride | 340/571 X |
| 5,677,850 | 10/1997 | Ott | 340/571 X |
| 5,748,083 | 5/1998 | Rietkirk | 340/571 X |
| 5,748,084 | 5/1998 | Isikoff | 340/571 X |
| 5,754,108 | 5/1998 | Ungarsohn | 340/571 X |
| 5,757,271 | 5/1998 | Andrews | 340/568 |
| 5,760,690 | 6/1998 | French | 340/571 |
| 5,781,109 | 7/1998 | Nakajima | 340/571 |
| 5,872,515 | 2/1999 | Ha et al. | 340/571 |

*Primary Examiner*—Thomas Mullen
*Attorney, Agent, or Firm*—Dean A. Craine

[57] ABSTRACT

A computer anti-theft system that includes a remote transmitter unit carried by the user, a dongle that physically attaches and selectively locks onto the parallel port on an existing computer, and a software program that is loaded into the computer's memory. When the system is activated, the remote transmitter unit transmits a pulse code signal which is received by a receiver component located inside the dongle. When the pulse code signal is received, the dongle is elevated to an active state. The dongle then transmits a return pulse code signal to the remote transmitter unit and the loop continues. If no pulse code signal is received, the dongle, is elevated to an alarm state. An alarm pulse code signal is then broadcast to the remote transmitter unit and elevating it to an alarm state. In one embodiment, the software program is used to control a solenoid inside the dongle which prevents removal of the dongle from the parallel port. The dongle and remote transmitter are electrically self contained thereby enabling the computer to be turned-off.

20 Claims, 3 Drawing Sheets

COMPUTER ANTI-THEFT SYSTEM

BACKGROUND OF THE INVENTION

1. Field of the Invention

This invention relates to anti-theft systems for portable objects, and, more particularly, to such systems adapted specifically for personal computers.

2. Description of the Related Art

It is widely known that theft of laptop and desktop personal computers is a serious problem and is increasing annually.

Security devices for computers, such as cables and locks which physically attach a computer to a work station are common. So are computer software programs which require the user to enter a pre-programmed password into the computer before it may be used. It is also common to attach a device to a component, such as a floppy disk drive, which renders the computer inoperable until removed with the correct key or code (see U.S. Pat. Nos. 5,400,622 and 5,660,065).

Motion detecting security systems or devices for small personal items, such as suitcases, attache cases, and skis are also widely known (see U.S. Pat. Nos. 4,155,079, 4,272,763, and 5,660,065).

Recently, an integrated alarm system for portable computers has been developed which, when armed, sounds an alarm or disables the computer upon unauthorized movement of the computer from a stationary position. The alarm system includes one or more motion sensors and/or micro switches that provide a signal indicating that the portable computer has been moved from a stationary position or that the computer is being opened from its closed position (see U.S. Pat. No. 5,760,690).

Also, a security system specifically designed for laptop computers has been recently developed which includes a security device internally connected to the computer. The security system also includes a remote unit which, together with the security device, acts as a vicinity switch which signals an alarm when the security device and remote unit are no longer within a specific range. In one embodiment, the system includes a motion detecting alarm internally connected to the computer,(see U.S. Pat. No. 5,757,271).

A major drawback with motion detecting alarm systems is that they can only be used when the computer is stationary. When the computer is being transported, which is the most common situation when theft occurs, the motion detecting alarm must be inactive. Another drawback with motion detecting alarm systems is that depending upon the sensitivity of the motion detecting switches, the computer may be gently moved by a thief without activating the motion detecting alarm system.

A major drawback with internally connected vicinity switch systems is that they require one of the bays or slots inside the laptop computer. Further, they require the computer's system be turned on when armed, which makes them dependent on the laptop's battery.

Ideally, a security system for a laptop computer should prevent theft while the computer is both stationary and while being transported. Further, it should be selectively affixed externally to the computer and not require the use of a bay or slot inside the computer. Still further, it should not be dependent on the computer's system being activated or the computer's battery.

SUMMARY OF THE INVENTION

It is an object of the invention to provide an anti-theft system for a laptop computer to protect it while stationary or when transported.

It is another object of the invention to provide an anti-theft system that is selectively affixed externally to the computer and can only be removed and activated or deactivated by the user.

It is further object of the invention to provide such an anti-theft system which is not dependent on the computer's system or battery.

It is still further object of the invention to provide such an anti-theft system that provides an alarm signal to the user away from the computer.

These and other objects are met by a computer anti-theft system, including a remote transmitter unit carried by the user, a fixed receiver unit that connects to an external port on a computer, and a software program loaded into the computer's memory. The fixed receiver unit is coupled with a switching means which, upon activation, automatically activates a first alarm means also coupled to the fixed receiver unit. In one embodiment, the switching means is a vicinity switch comprised of components located in the remote transmitter unit and the fixed receiver unit. During operation, both the remote transmitter unit and the fixed receiver unit are initially in a low power, hibernating state. When the main button on the remote transmitter unit is pressed, a programmed pulse code signal is broadcast to the fixed receiver unit. When the pulse code signal is received by the fixed receiver unit, the fixed receiver unit is elevated to an active state. When the fixed receiver unit is in the active state, a pulsed code signal is broadcast to the remote transmitter unit. When the pulse code signal is received by the remote transmitter unit, the remote transmitter unit is then elevated to an active state. If a pulse code signal is not received by the fixed receiver unit while in an active state, it automatically elevates to an alarm state. An alarm pulse code signal is then broadcast from the fixed receiver unit elevating the remote transmitter unit to an alarm state. A second alarm means coupled to the remote transmitter unit is then activated to inform the user that the fixed receiver unit is fully activated and that a theft may be occurring.

In other embodiments, the switching means may be a motion detecting switch located inside the fixed receiver unit which informs the user that the computer has been moved.

The fixed receiver unit, hereinafter known as a dongle, is designed to physically connect and lock onto one of the external ports on the computer. Unlike internal bays and slots in which various hardware components may be attached but not locked in place, hardware devices are not normally attached to external ports when the computer is being transported or setup in a temporary location. In the embodiment shown herein, the dongle is attached to a parallel port on the computer.

The software program loaded into the computer's memory is used to program the pulse code signal in the remote transmitter unit and the fixed receiver unit. It is also used to activate a locking means located inside the dongle, thus preventing the dongle's physical removal from the parallel port and, to deactivate the fixed receiver unit.

Both the dongle and remote transmitter unit are independently energized and not dependent on the software program or computer power system during use.

DESCRIPTION OF THE PREFERRED EMBODIMENT(S)

Figure 1:
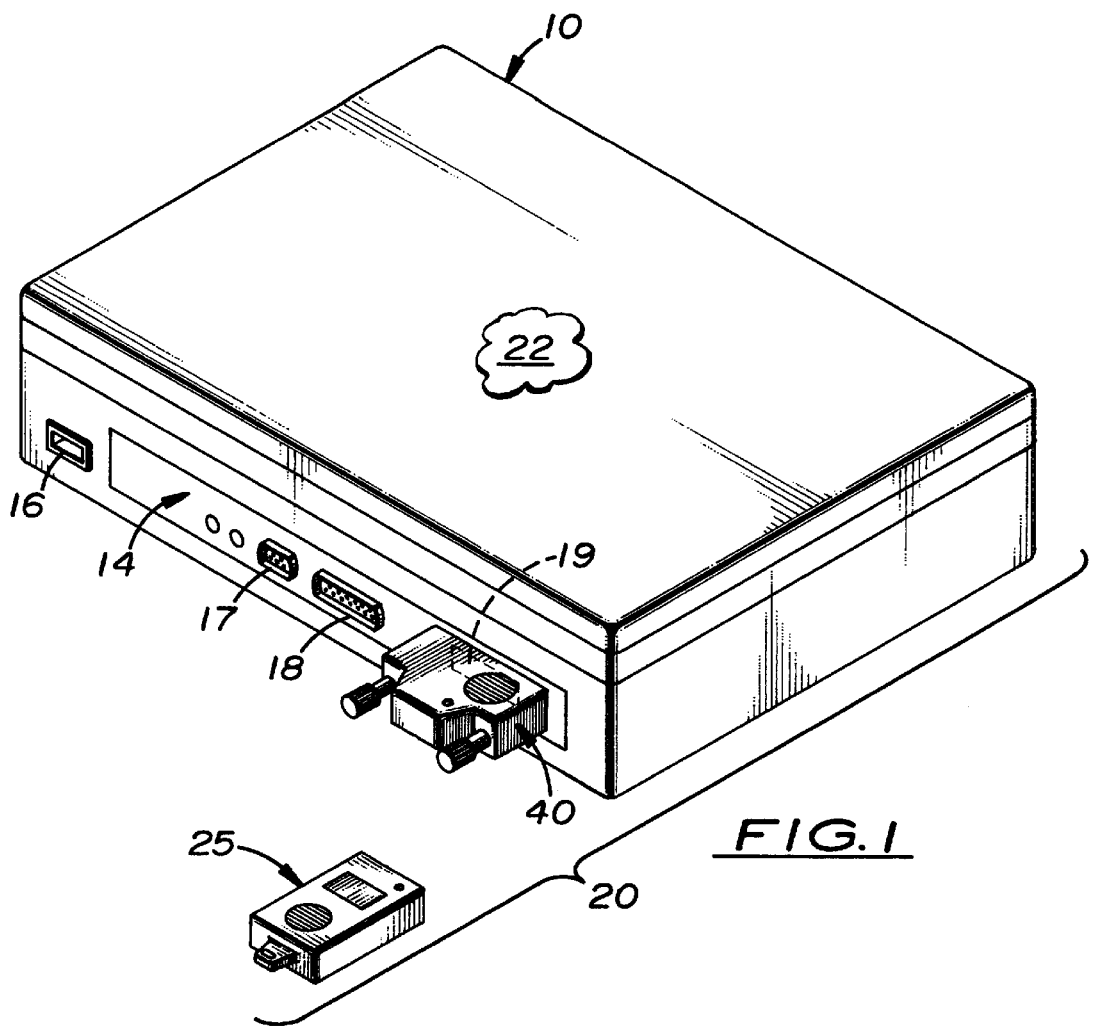
FIG. 1 is a perspective view of the computer anti-theft system disclosed herein.

Referring to the accompanying FIGS. 1–5, there is depicted a computer anti-theft system, generally referred to as 20, used as a security device for a laptop computer 10. The computer 10 includes a main body 12 with a rear panel 14 that holds a power plug 16 and a plurality of external peripheral device port connectors 17–19.

The system 20 includes a software program 22, a remote transmitter unit 25, and a fixed receiver unit known as a dongle 40. During use, the software program 22 is loaded into the computer's memory, the remote transmitter unit 25 is carried by the user, and the dongle 40 is selectively locked onto the computer's parallel port 19 as discussed further below.

In the preferred embodiment, a vicinity switch 24 is disposed between the remote transmitter unit 25 and the dongle 40 which is automatically activated when the remote transmitter 25 and dongle 40 are beyond a specific distance from each other.

Figure 2:
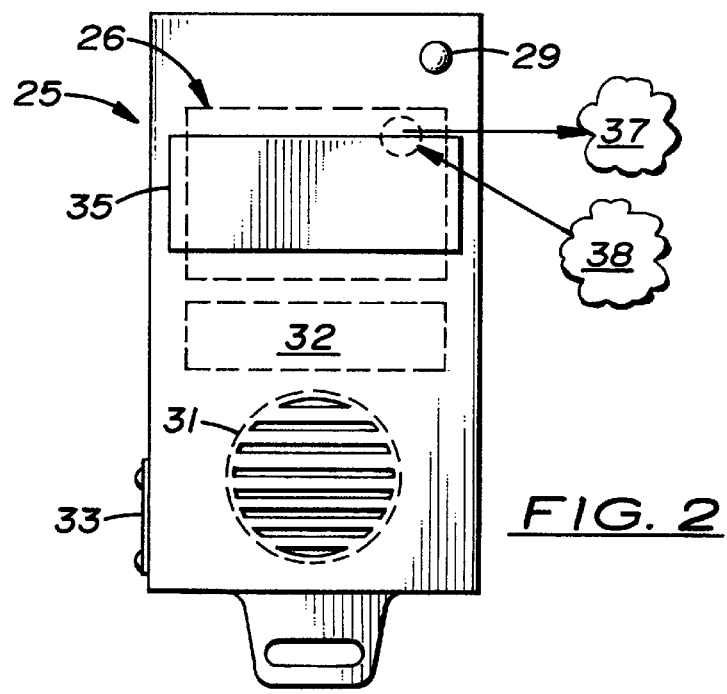
FIG. 2 is a top plan view of the remote unit.
Figure 3:
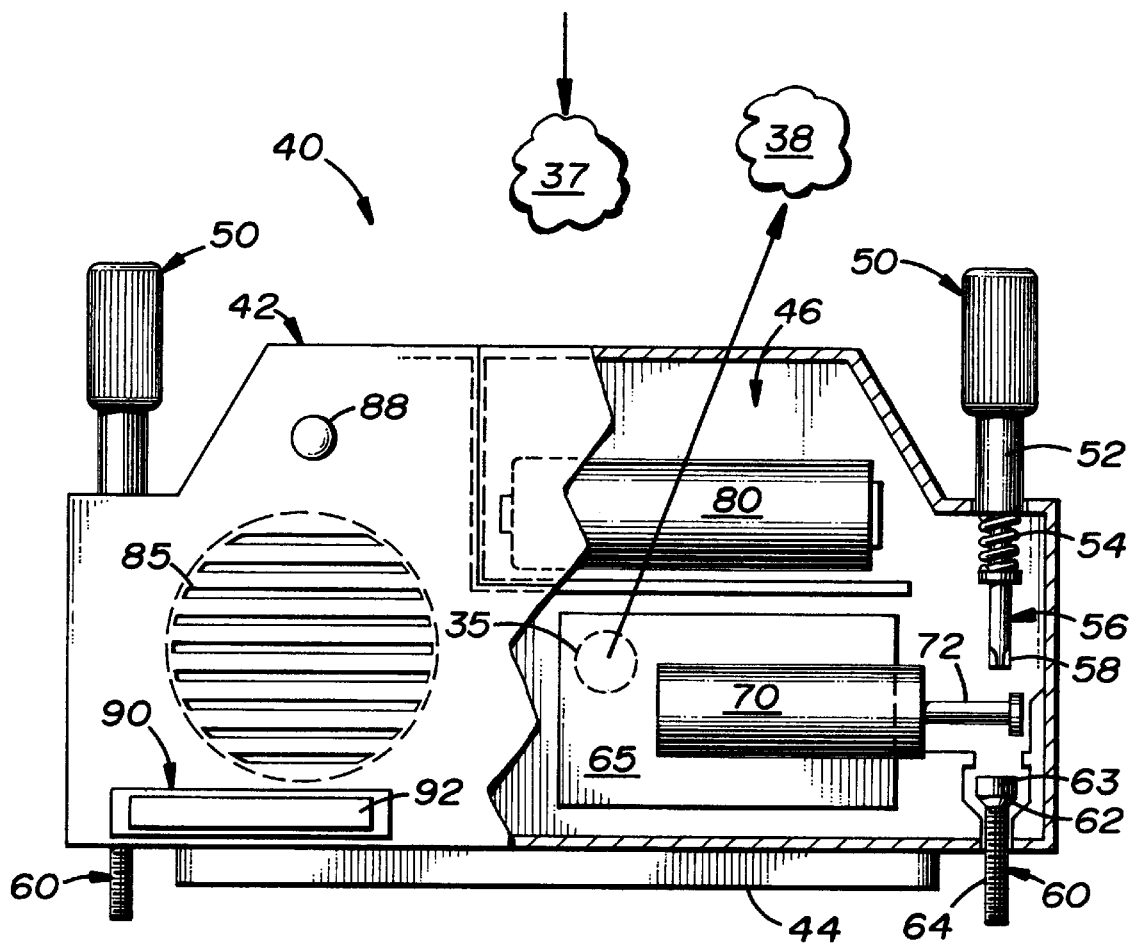
FIG. 3 is a top plan view partially in section of the dongle.
Figure 3:
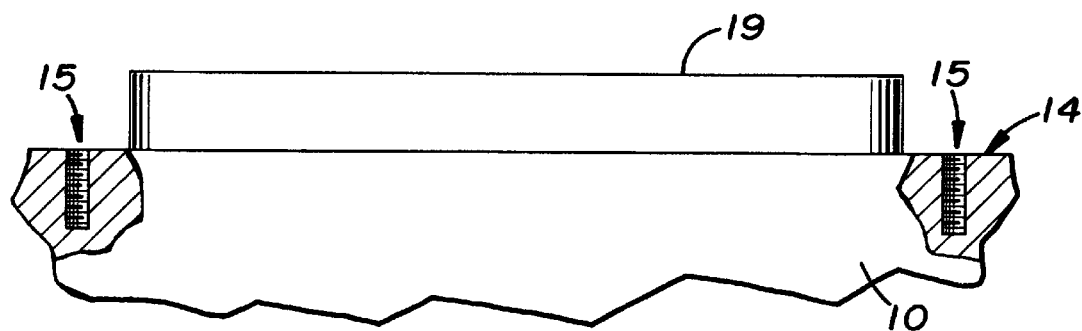

As shown in FIG. 2, the remote transmitter unit 25 includes a circuit card 26 with a transmitter component 27, an LED 29, a speaker 31, a battery 32, an optional on/off switch 33, and a main push button switch 35 all electrically connected together. During use, the transmitter component 27 broadcasts a continuous pulse code signal 37 capable of being received by a receiver component 66 located inside the dongle 40 as shown in FIG. 3. When the pulse code signal 37 is received by the receiver component 66, a circuit board 65 located inside the dongle 40 is elevated to an active state. When the pulse code signal 37 is not received by the receiver component 66, the control card 65 becomes elevated to an alarm state, which in turn, activates the audio and/or visual alarms 85, 88, respectively, electrically connected thereto. An alarm pulse code signal 38 is then transmitted to the transmitter component 27 which elevates it into an alarm state. A speaker 31 and LED 29 coupled to the circuit card 26 are then activated to inform the user that a theft may be occurring.

Also as shown in FIG. 3, the dongle 40 is designed to attach to the parallel port 19 on the rear panel 14 of the computer 10 via a D-25 pin connector 44. A locking means is included in the dongle 40 which physically locks the dongle 40 to the parallel port 19. The dongle 40 includes an outer housing 42 with an internal cavity 46 formed therein. Disposed inside the internal cavity 46 is the circuit card 65 with an integrally connected receiver component 66. A solenoid 70, a battery 80, a speaker 85 and optional LED 88 are electrically connected to the circuit card 65. Extending perpendicularly from the opposite sides of the rear surface of the outer housing 42, are adjustment screws 50. At least one adjustment screw 50 includes a proximal neck 52 and distal shank 56. A blade element 58 is formed on the tip of each distal shaft 56. Disposed around the upper portion of the distal shaft 56 and inside the outer housing 42 is a longitudinally aligned spring 54 designed to hold the adjustment screw 50 in an extended position on the outer housing 42. Located inside the outer housing 42 and spaced apart and longitudinally aligned with each adjustment screw 50 is an extension 60. The extension 60 includes an upper head 62 with a slot 63 formed therein designed to engage the blade element 58 on the distal shaft 56 when the adjustment screw 50 is pressed inward. External threads 64 are formed on the distal portion of the extension 60 which connect to standard threaded bores 15 located on the rear panel 14 on opposite sides of the parallel port 19.

The locking means includes a transversely aligned solenoid 70 with an arm 72 that extends longitudinally therefrom when activated. The solenoid 70 is disposed adjacent to the space created between the distal shank 56 on the adjustment screw 50 and the upper head 62 on the extension 60. When the solenoid 70 is activated, the arm 72 extends outward and prevents the blade element 58 from engaging the slot 63 on the extension 60, thus preventing engagement of the distal shank 56 to the extension 60. After the extension 60 is attached to the bore 15, the arm 72 prevents the extension 60 from being disconnected therefrom. It should be understood that the locking means described above could be replaced with a physical lock and key that attaches the dongle 40 to the parallel port 19.

The software program 22 is designed to activate and deactivate the system 20 and to adjust the position of the arm 72 inside the dongle 40. When the software program 22 is installed on the computer, it instructs the user on how to setup both the remote transmitter unit 25 and the dongle 40. A password and code is then selected and entered into the computer, and stored in the receiver component 66 and transmitter component 27 via the parallel port 19. After the transmitter component 27 and receiver component 66 are programmed, the remote transmitter unit 25 and dongle 40 may communicate with each other. The software program 22 is then used to move the arm 72 on the solenoid 70 from the unlocked to the locked position. The original password may be also used to prevent operation of the software program and to change the pulse code signal or to unlock the dongle 40.

Figure 5:
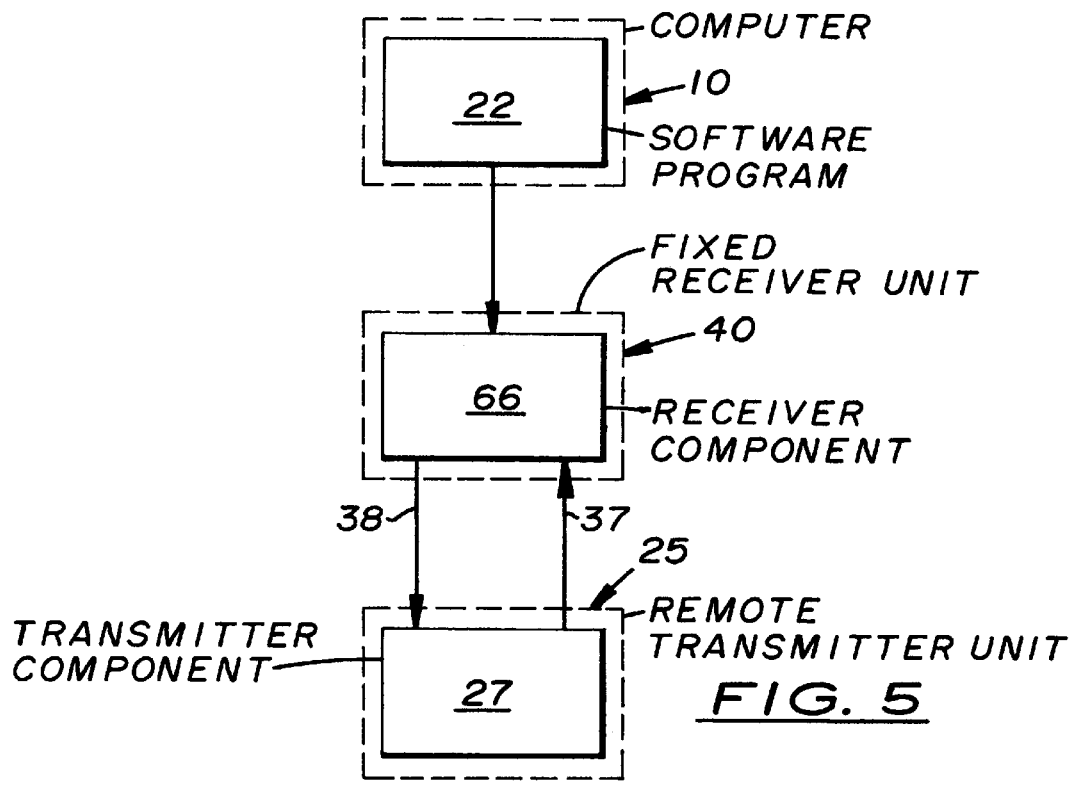
FIG. 5 is a flow chart illustrating how the pulse code signal and return pulse code signal are used.

After the remote transmitter unit 25 and dongle 40 are initially programmed, they are automatically activated in a hibernated state. Optional main switch 33 may be included on remote transmitter unit 25 to selectively activate and deactivate the remote transmitter unit 25. As shown in FIG. 5, once the system 20 is activated, the transmitter component 27 sends the pulse code signal 37 to the receiver component 66 located in the dongle 40. If the pulse code signal 37 is not received, the receiver component 66 is activated in an alarm state and an alarm pulse code signal 38 is broadcast to the remote transmitter unit 25. If at any time, the receiver component 66 receives pulse signal code 37, the loop continues and the circuit cards 26 and 65 remain in an active state.

Figure 4:
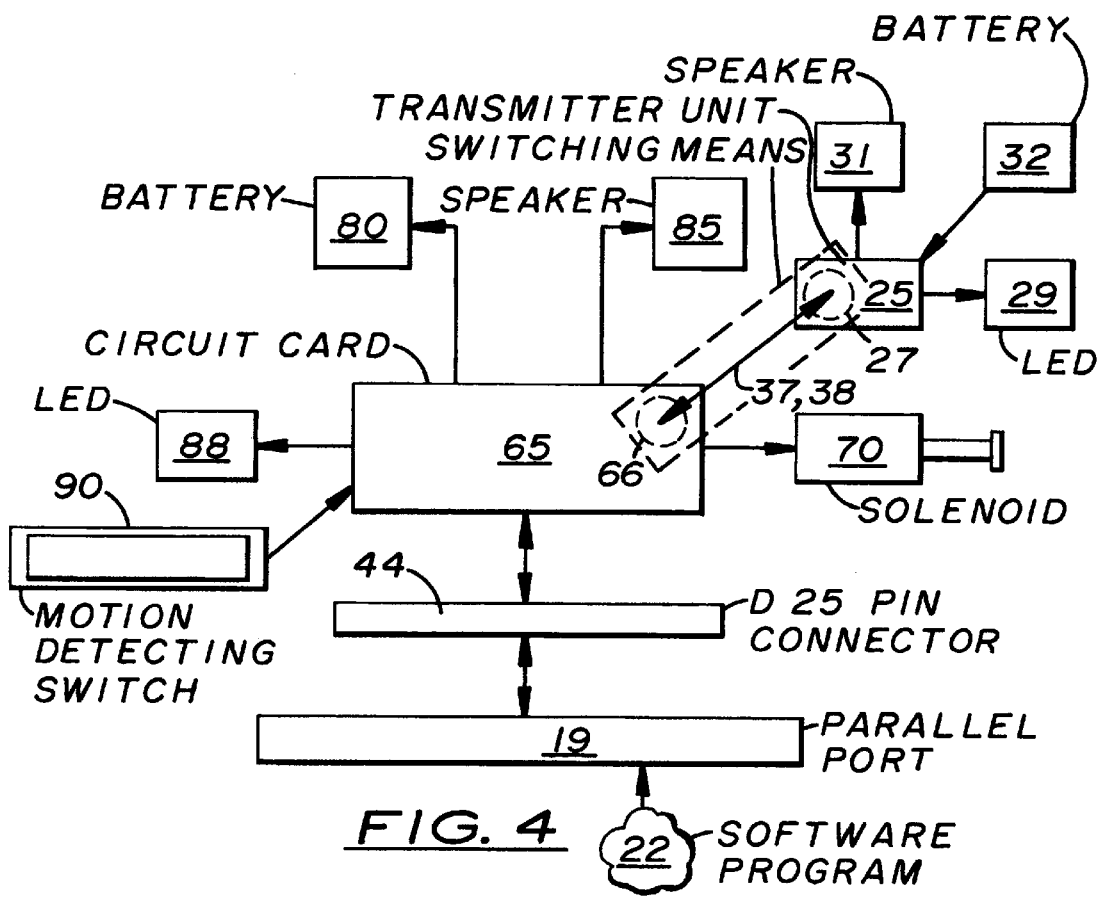
FIG. 4 is a flow chart illustrating how the components are connected.

In another embodiment shown in FIGS. 3 and 4, the dongle 40 may include a motion detecting switch 90 which acts as an additional component to the vicinity switch or may replace the vicinity switch. The motion detecting switch 90 may comprise a mercury switch attached to the outer housing 42 which is electrically coupled to the circuit card 65. When the dongle 40 is moved, the motion detecting switch 90 is activated which elevates the circuit card 65 to an alarm state and activates the speaker 85 and LED 88.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. An anti-theft system for a computer having operating memory and at least one external port, said system comprising:
   a. a receiver component located in a receiver unit capable of being affixed to the external port on the computer, said receiver component capable of receiving or transmitting a pulse code signal;
   b. a first alarm means coupled to said receiver component;
   c. a locking means to lock said receiver unit to the external port;
   d. a transmitter component capable of transmitting or receiving a pulse code signal to communicate with said receiver component;
   e. a second alarm means coupled to said transmitter component, said second alarm means being activated when said first alarm coupled to said receiver component is activated; and,
   f. a software program loaded into the memory of said computer, said software program capable of programming said pulse code signal to said receiving component and said transmitter component.

2. An anti-theft system, as recited in claim 1, wherein said first alarm means coupled to said receiver component is activated when said receiver component and said transmitter component are moved outside a selected range.

3. An anti-theft system, as recited in claim 2, wherein said software program is capable of activating or deactivating said locking means.

4. An anti-theft system, as recited in claim 1, further including a motion detecting switch connected to said remote receiver component.

5. An anti-theft system, as recited in claim 4, wherein said software program is capable of activating and deactivating said locking means.

6. An anti-theft system, as recited in claim 1, wherein said first alarm means is an audio alarm.

7. An anti-theft system, as recited in claim 1, wherein said first alarm means is a visual alarm.

8. An anti-theft system as recited in claim 1, further including said first alarm means and said locking means being housed inside said receiver unit.

9. An anti-theft system, as recited in claim 8, wherein said locking means is a solenoid with a selectively extendable arm, said solenoid being disposed inside said receiver unit so that said arm may selectively extend to prevent the removal of said receiver unit from said external port.

10. An anti-theft system, as recited in claim 9, wherein said software program is used to activate said solenoid and extend said arm therefrom and thereby prevent the removal of said receiver unit from said external port.

11. An anti-theft system, as recited in claim 10, wherein said receiver unit is threadingly attached to said external port.

12. An anti-theft system, as recited in claim 11, wherein said external port is a parallel port.

13. An anti-theft system for a computer having an external port, said system comprising:
   a. a dongle capable of being connected to the external port on the computer;
   b. a receiver component housed inside said dongle;
   c. a switching means housed inside said dongle and coupled to said receiver component to indicate an alarm condition;
   d. a first alarm means housed inside said dongle and coupled to said switching means;
   e. a locking means housed inside said dongle to lock said dongle to the external port on the computer;
   f. a remote transmitter unit containing a transmitter component capable of transmitting or receiving a pulse code signal from said receiver component, said transmitter component including a second alarm means coupled to said first alarm means to indicate when said first alarm means is activated; and,
   g. a software program loaded into the computer, said software program capable of activating and deactivating said receiver component and said locking means in said dongle.

14. An anti-theft system, as recited in claim 13, wherein said switching means activates said first alarm means when said receiver component and said remote transmitter component are outside a selected range of each other.

15. An anti-theft system, as recited in claim 14, wherein said switching means includes a motion detecting switch connected to said receiver unit.

16. An anti-theft system, as recited in claim 15, wherein said second alarm means is an audio alarm.

17. An anti-theft system, as recited in claim 16, wherein said second alarm means includes a visual alarm.

18. An anti-theft system, as recited in claim 13, wherein said locking means is a solenoid with a selectively extendable arm, said solenoid being disposed inside said dongle so that said arm may prevent the removal of said dongle from said external port.

19. An anti-theft system, as recited in claim 18, wherein said software program is used to activate said solenoid to extend said arm therefrom and prevent the removal of said dongle from said external port.

20. An anti-theft system for a computer having operating memory and at least one external port, said system comprising:
   a. a receiver unit capable of being affixed to the external port on the computer, said receiver unit including a receiver component capable of receiving or transmitting a pulse code signal;
   b. a switching means coupled to said receiver component;
   c. a first alarm means coupled to said switching means capable of being activated to an alarm state;
   d. a locking means to lock said receiver unit to the external port;
   e. a remote transmitter unit including a transmitter component capable of transmitting or receiving said pulse code signal to communicate with said receiver component; and,
   f. a second alarm means coupled to said transmitter component capable of indicating when said first alarm means is activated.

* * * * *